United States Patent [19]

Faryar et al.

[11] Patent Number: 5,243,419
[45] Date of Patent: Sep. 7, 1993

[54] SOFT CODING FOR HDTV

[75] Inventors: Alireza F. Faryar, Shrewsbury; Scott C. Knauer, Mountainside; George J. Kustka, Marlboro; Kim N. Matthews, Watchung; Arun N. Netravali, Westfield; Eric D. Petajan, Watchung; Peter H. Westerink, Newark, all of N.J.

[73] Assignee: AT&T Bell Laboratories, Murray Hill, N.J.

[21] Appl. No.: 785,671

[22] Filed: Oct. 31, 1991

[51] Int. Cl.⁵ ............................ H04N 7/12; H06N 7/08
[52] U.S. Cl. ..................................... 358/133; 358/135; 358/142; 370/84; 375/38
[58] Field of Search ................ 358/133, 135, 136, 142, 358/167, 36; 382/56; 370/84, 82, 83, 99, 112; 375/38, 58

[56] References Cited

U.S. PATENT DOCUMENTS

| | | | |
|---|---|---|---|
| 5,068,723 | 11/1991 | Dixit et al. | 358/133 |
| 5,105,442 | 4/1992 | Wei | 358/13 |
| 5,111,292 | 5/1992 | Kuriacose et al. | 358/133 |
| 5,115,309 | 5/1992 | Hang | 358/133 |
| 5,122,875 | 6/1992 | Raychaudhuri et al. | 358/133 |
| 5,128,756 | 7/1992 | Johnston et al. | 358/133 |
| 5,164,963 | 11/1992 | Lawrence et al. | 375/39 |

*Primary Examiner*—John K. Peng
*Attorney, Agent, or Firm*—Henry T. Brendzel

[57] ABSTRACT

Blocks of HDTV picture information are selected for transmission at a plurality of channel rates of an HDTV transmitter. The size of each block of HDTV picture information is dependent on a target distortion parameter for the HDTV picture information. As a result of this selection, a portion of each block of HDTV picture information is transmitted at the lower channel rate, with the result that the HDTV transmitter range is maximized while maintaining a picture quality for the resulting HDTV video image.

15 Claims, 4 Drawing Sheets

SOFT CODING FOR HDTV

BACKGROUND OF THE INVENTION

This invention relates to High Definition Television (HDTV). More particularly, this invention relates to a method and apparatus for encoding and decoding digital data that represents video signals.

An HDTV transmission system will provide HDTV images with much greater resolution than the existing NTSC (National Television System Committee) television (TV) image. However, any HDTV transmission system is currently required to use the existing NTSC TV 6 MHz channel allocations, which are in the VHF (Very High Frequency) and UHF (Ultra High Frequency) bands. As a result, an HDTV image, which contains more picture information than an NTSC image to provide the increased resolution, must be compressed in order to fit within an NTSC TV channel. Since much more powerful video compression schemes can be implemented with digital signal processing than with analog signal processing, it is possible that some form of digital transmission system will be required for an HDTV image so that the above transmission constraint can be met. However, there has been some concern about becoming committed to an all-digital transmission system because of the potential sensitivity of digital transmission to small variations in signal-to-noise ratio at the various receiving locations. This sensitivity can result in a quick degradation in performance, which is generally not considered acceptable by the broadcast industry. By comparison, the degradation in performance for presently used NTSC TV transmission is much more graceful.

One approach to providing graceful degradation for a digital HDTV signal is to characterize the HDTV signal into classes of "more important" and "less important" information (i.e., different classes of information) and then transmit the more important and less important information using different size signal point constellations. This approach provides unequal error protection for the more important information, and allows a graceful degradation in reception quality at the TV set location because, as the bit-error rate at the receiver begins to increase with increasing distance from the broadcast transmitter, it will be the less important information of the TV signal information that will be the first affected.

Unfortunately, the amount of picture information is an HDTV signal is generally proportional to the complexity of each HDTV image that is transmitted, i.e., the amount of picture information that is considered to be more important and less important is variable. In addition, for a given HDTV transmission scheme, there is a limited channel rate (bits/symbol). As a result, the actual amount of more and less important information that can be transmitted is limited by the channel rate—which impacts picture quality. While the general concept of separating the HDTV signal into more and less important information is an advantageous technique for providing unequal error protection, it does not give any guidance on how to allocate the HDTV signal into the different classes of information to support a variable amount of picture information within a limited capacity transmission channel—and yet maintain picture quality.

SUMMARY OF THE INVENTION

In accordance with the invention, a method and apparatus is realized that adaptively switches between two different channel rates in an HDTV transmitter. Using a technique called "soft coding,38 the amount of HDTV picture information that is more important is adaptively selected and then transmitted at the lower channel rate, with the remainder of the HDTV picture information transmitted at the higher channel rate.

In an embodiment of the invention, the selection of the amount of more important information is determined by a target distortion parameter of the HDTV picture information. The selection is repetitively performed for each block of HDTV picture information that is transmitted—with the result that picture quality is maintained.

DETAILED DESCRIPTION

Figure 1:
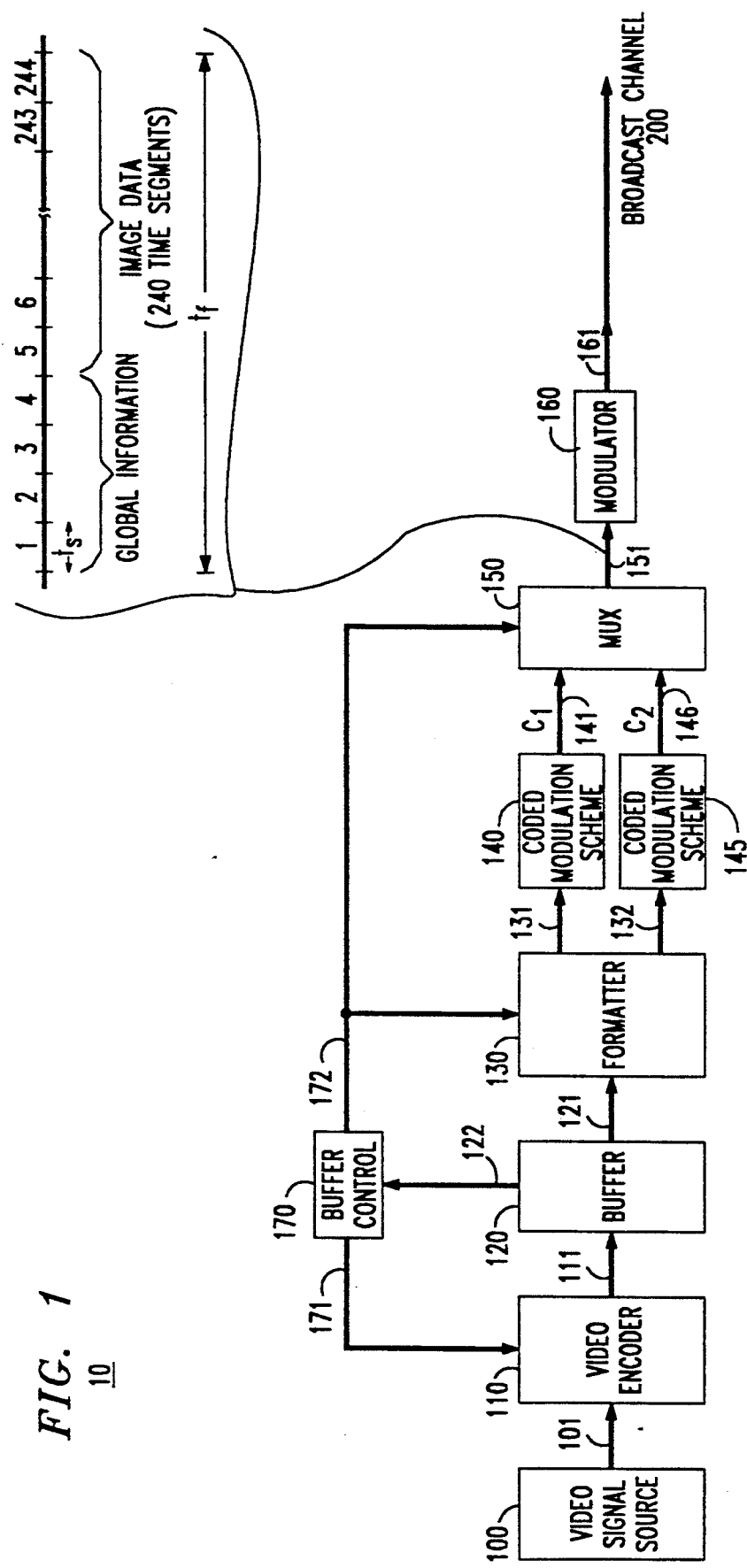
FIG. 1 is a block diagram of an HDTV transmitter embodying the principles of the invention.

FIG. 1 shows an illustrative HDTV transmitter in which the inventive concept is implemented. Video signal source 100 generates an digital HDTV signal, which comprises sequences of image frames (hereinafter simply referred to as an image sequence). The image sequence is applied to video encoder 110, which compresses each image frame in the sequence and provides a corresponding compressed image frame on output lead 111. It is assumed that video encoder 110 employs any of the well-known techniques for image compression, e.g., motion compensated predictive coding. An example of motion compensated predictive coding is shown in the co-pending, commonly assigned U.S. patent application of J. D. Johnson et al. entitled "A High Definition Television Coding Arrangement with Graceful Degradation," Ser. No. 07/625,349, filed on Dec. 12, 1990, now U.S. Pat. No. 5,128,756.

The amount of picture information, or data, contained in each compressed image frame depends on the complexity of the image frame and, as a result, is variable. For example, in motion compensated predictive encoding the compressed image frame depends on the current and previous image frames, i.e., the image sequence, and the desired level of picture quality. Assuming, for the moment, a given level of picture quality, the size of the compressed image frame will be smaller if the image sequence is an "easy" sequence than if the image sequence is a "difficult" sequence. An easy sequence results, for example, from a stationary camera pointed at a wall, while a difficult sequence results when the camera faces a moving car. Since a video compression scheme typically removes redundant information, it can be conceptually appreciated that the image sequence representing the stationary wall has more redundant information, which can be removed—hence making it an easy sequence, than the image sequence representing the moving car.

Since the amount of data provided by video encoder 110 varies, the video encoder output is applied to buffer 120, which isolates the remainder of the transmitter circuitry from the variable output data rate of video encoder 110.

Figure 2:
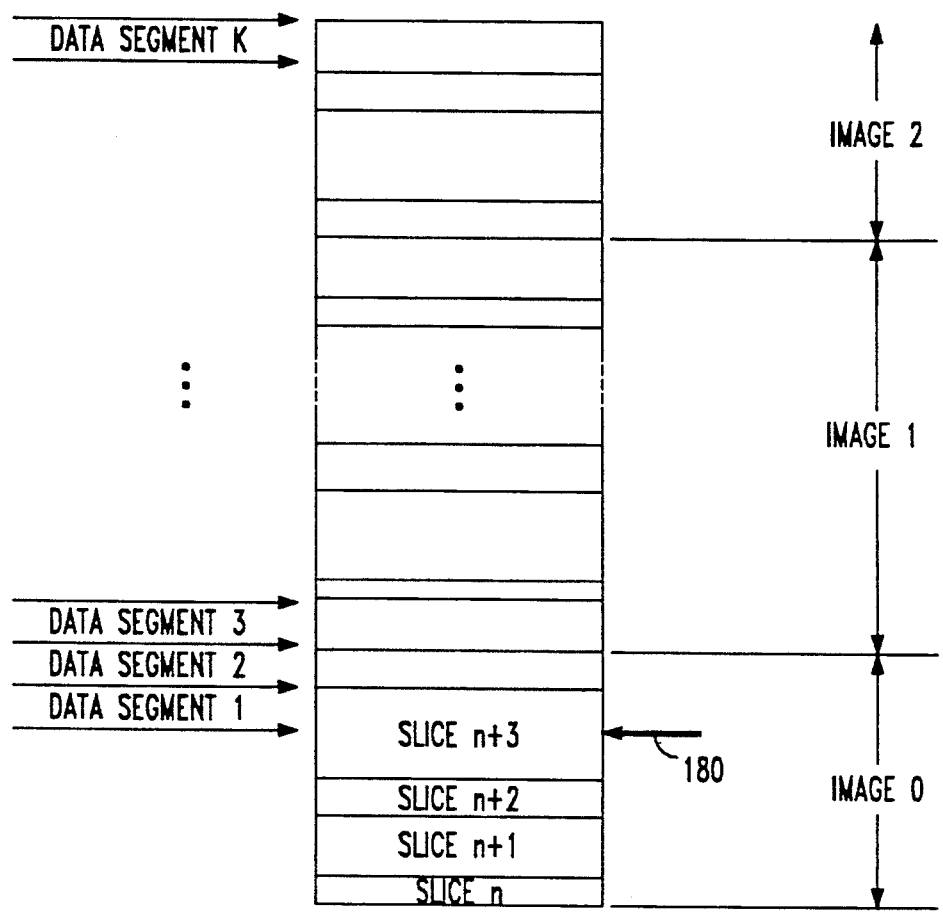
FIG. 2 is an illustrative representation of the storage of a number of images within the data segments of Buffer 120 of FIG. 1.

Buffer 120 accepts picture information from video encoder 110 in "slices" of, perhaps, variable amounts of data and stores those "slices" in order. This is illustrated in FIG. 2 which depicts buffer 120, where slice n contains less picture information (is skinnier) than slice n+1. Buffer 120 is, in effect, a FIFO memory with arrow 180 marking the memory location that was last extracted from buffer 120. That is, in the illustration of FIG. 2, arrow 180 specifies that the picture information of slices n, n+1, n+2 and a portion of slice n+3 have been previously extracted from buffer 120. Picture information is extracted from buffer 120 in data segments of fixed size, e.g., data segment 1, data segment 2, . . . , data segment K, of FIG. 2.

The data that is broadcast over channel 200 is broadcast in "broadcast frame" sections, such as in NTSC frames, $t_f$. In the illustrative embodiment described herein, $t_f$ is divided into 244 time segments. Four of those time segments are devoted to global information (described in more detail below) and the remaining 240 time segments are devoted to image data. Since the transmission rate of broadcast channel 200 is fixed, that means the number of symbols that are transmitted during each time segment is also fixed. In accordance with the principles of this invention, as described in more detail below, there isn't a one-to-one correspondence between symbols that are transmitted over broadcast channel 200 and the bits of picture information that are stored in buffer 120. Moreover, the amount of picture information that the video encoder produces for each image frame varies. Consequently, there is no synchronization between image frames and the broadcast frames, nor between image frames and the data segments. This is depicted in FIG. 2 by the image demarcation marks and the data segment demarcation marks.

Since $t_f$ corresponds to an NTSC frame rate, there is time during the vertical retrace period to perform the calculations necessary for the determining the amount of data that will be accessed from buffer 120 during the next broadcast frame or, in other words, the next location of arrow 180. Alternatively, buffer 120 may be designed to be large enough so that a one-frame delay may be permitted. By allowing buffer 120 to contain more information, the calculations for a next frame can always be carried out while the current frame is being delivered out from buffer 120. In the following discussion, the latter approach is assumed. Thus, buffer 120 provides each data segment to formatter 130. The latter, in response to buffer control 170, via lead 172, formats the data segments in each compressed image frame for transmission in time-frame, $t_f$. In accordance with the invention, as discussed in detail below, buffer control 120, via lead 172, allocates each data segment to either coded modulation scheme 140 or coded modulation scheme 145. Coded modulation schemes 140 and 145 use any of the well-known channel coding schemes, e.g., trellis-coding, and provide a sequence of symbols on leads 141 and 146 at channel rates $C_1$ and $C_2$ respectively. For the purposes of this example, $C_1 = 1$ bit/symbol and $C_2 = 2$ bits/symbol.

In accordance with the illustrative embodiment of this invention, data is sent during each time segment at either $C_1$ or at $C_2$. That means that a time segment at which data is being sent at $C_2$ extracts twice as many bits of information from buffer 120 than the number of bits extracted from buffer 120 during transmission of a time segment where data is sent at $C_1$. Stated conversely, twice as many time segments are needed when data is sent at $C_2$ then when data is sent at $C_1$. The data that is extracted from buffer 120 is extracted in order. Accordingly, one data segment (beginning with, perhaps, a portion of a slice, continuing with the following few slices, and terminating, perhaps, with a portion of another slice) may be sent at $C_1$ while the next data segment is sent at $C_2$.

In accordance with one feature of this invention (the "pair rule"), data segments that are sent at rate $C_1$ are always sent in pairs. Stated in different words, the sequence of transmissions may have an odd number of contiguous data segments sent at $C_2$ but must have an even number of contiguous data segments that are sent at $C_1$.

In addition, formatter 130 provides information to the "global information field" that is transmitted in the first four time segments of a broadcast frame. The information is sent at the lower rate ($C_1$). This global information field contains information relative to the particular broadcast frame being sent, e.g., what rate is assigned to each time segment, information on how to reconstruct the compressed image frame from the received data segments (as mentioned above, the boundaries of a compressed image frame may not coincide with the data segment boundaries), and may include other information as to the transmission format of the overal HDTV signal. In particular, information as to the rate assigned to the time segments is contained within a "mask" comprising 120 bits, where each bit corresponds to a pair of time segments, with each respective bit indicating the corresponding channel encoder used for that pair of time segments. The need of only 120 bits in the mask is a direct consequence of the decision to send $C_2$ time segments in pairs.

The coded modulation scheme outputs, on leads 141 and 146, are applied to multiplexer (mux) 150, which is responsive to buffer control 170, via lead 172, to provide a sequence of symbols to modulator 160. The later is representative of conventional modulation circuitry for transmission of the broadcast HDTV signal on broadcast channel 200.

Figure 7:
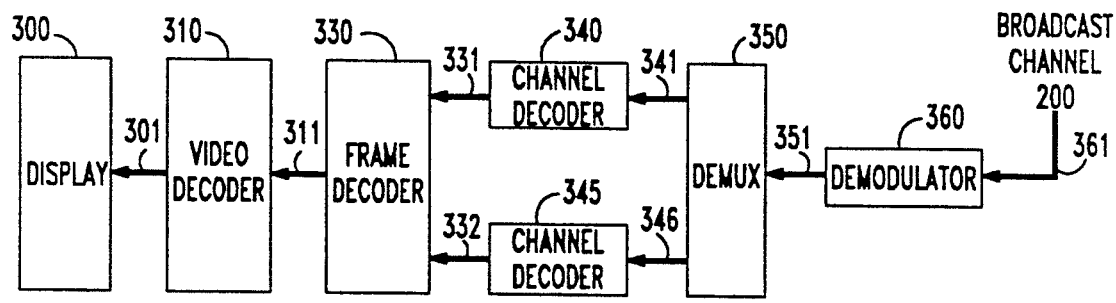
FIG. 7 is a block diagram of an HDTV receiver.

The broadcast HDTV signal is received from broadcast channel 200 by receiver 30, which is shown in FIG. 7. The broadcast HDTV signal is received by demodulator 360, which is representative of conventional synchronization to $t_f$, reception and demodulation circuitry, e.g., the antenna, demodulation, analog-to-digital conversion, etc. Demodulator 360 provides controls and a time-multiplexed digital signal representing the received coded outputs on lead 351, which is processed by demultiplexer (demux) 350 to provide separate received coded outputs. In the beginning of each time frame $t_f$ (derived from the controls supplied by 360), demux 350 receives the global information field and based on the mask information, it allocates segments to either line 341 or to line 346. The received coded outputs at rate $C_1$, representing the more important data, is provided to channel decoder 340 and the received coded outputs at rate $C_2$ representing the less important data, is provided to channel decoder 345. Channel decoder 340 and 345 decode the received coded outputs to provide the more important and less important information to frame decoder 330 via leads 331 and 332, respectively. Frame decoder 330 recombines the data segments sent in a particular frame and provides the data segments to video decoder 310, which provides the inverse function of video encoder 110 of HDTV transmitter 10, to provide the received HDTV signal to display 300.

Generally, the sensitivity of the signal-to-noise ratio of a digital HDTV transmission system is proportional to the channel rate, i.e., for a given receiver location, the higher the rate is the more sensitive the transmitted HDTV signal is to noise, which results in a decrease in picture quality. In light of this, the "less important" information is sent at the higher channel rate, $C_2$, and the "more important" information is sent at the lower channel rate, $C_1$. Therefore, in any time frame, $N_{mi}$ of the data segments are transmitted as more important information, with each of the $N_{mi}$ data segments being transmitted in 2 time segments. Consequently, the number of remaining data segments transmitted as less important data segments, $N_{li}$, is equal to:

$$N_{li} = 240 - 2N_{mi}, \text{ where } (0 \leq N_{mi} \leq 120).$$

As a result, the total number of data segments sent in any time frame is:

$$N_{mi} + N_{li} = N_{mi} + (240 - 2N_{mi}) = 240 - N_{mi}.$$

As mentioned above, buffer control 170 controls formatter 130 and multiplexer 150, via lead 172. In addition, buffer control 170 receives buffer status information from buffer 120 on lead 122. This buffer status information is assumed to include a variety of information about the compressed images that are stored in buffer 120. For example, specific information about particular coefficients, or characteristics, provided by video encoder 110 for each of the compressed images may be included along with the level of buffer fullness, $B_t$. The number $B_t$, represents the buffer fullness, i.e., the level to which buffer 120 is filled up with data (above arrow 180) as a result of the compressed image frame provided by video encoder 110 at time t. Since the data in buffer 120 comprises data representative of both easy and difficult sequences, it can be appreciated that in any sequence of compressed image frames received by buffer 120 the more difficult sequences there are, the faster buffer 120 will fill up. As a result, the ability to empty buffer 120 is dependent upon the effective, or composite, channel rate that is provided by the combination of coded modulation schemes 140 and 145. Indeed, if the composite channel rate is always fixed, picture quality will degrade since a difficult sequence will eventually overflow buffer 120—thereby losing data, i.e., picture information. (Although it will not be described herein, buffer control 170 may also control the operation of video encoder 110, via lead 171, to further control the buffer fullness, e.g., the coarseness of quantization used by video encoder 110 may be changed.) A number of co-pending, commonly assigned U.S. patent applications disclose various techniques that provide graceful degradation in the reception quality at a TV set location for an HDTV signal. These are V. B. Lawrence et al. entitled "Coding for Digital Transmission," Ser. No. 07/611,225, filed on Nov. 7, 1990, now U.S. Pat. No. 5,164,963; L. F. Wei entitled "Coded Modulation with Unequal Error Protection," Ser. No. 07/611,200, filed on Nov. 7, 1990, now U.S. Pat. No. 5,105,442; Johnston et at. (mentioned above); and H. Y. Chung et al. entitled "Multiplexed Coded Modulation with Unequal Error Protection," Ser. No. 07/627,156, filed on Dec. 13, 1990. However, these patent applications do not address the problem of how to allocate portions of each compressed image frame to the different classes of information, and consequently, the respective channel rates, to maintain picture quality in an image sequence comprising variable length compressed image frames.

Therefore, and in accordance with the invention, buffer control 170 adaptively switches formatter 130 (as outlined above) between two different channel rates in HDTV transmitter 10. Using a technique called "soft coding," the amount of HDTV picture information that is more important is adaptively selected from buffer 120 and then transmitted at the lower channel rate, with the remainder of the HDTV picture information transmitted at the higher channel rate. The selection of the amount of more important information is determined by a target distortion parameter of the HDTV picture information. The selection is repetitively performed for each block of HDTV picture information that is transmitted within a broadcast frame, $t_f$—with the result that picture quality is maintained.

Figure 3:
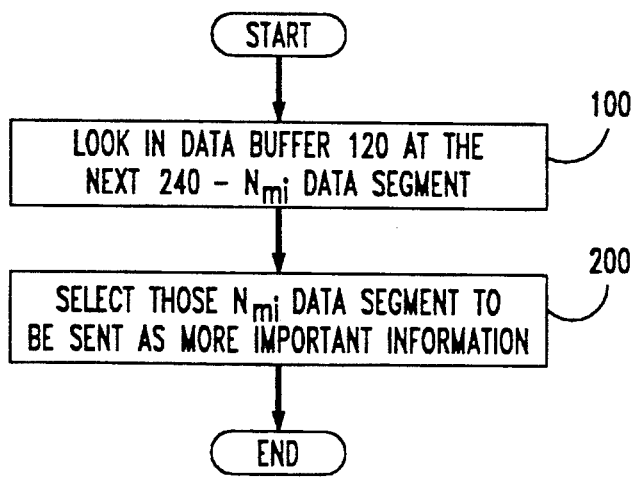
FIG. 3 is an illustrative flow diagram of a method of allocating the more important data segments to a channel rate.

For each broadcast frame a decision is made as to how many of the data segments should be sent at the lower channel rate, i.e., as more important data, and, consequently, how many of the data segments may be sent at the higher channel rate, i.e., as less important data. In general, as shown in FIG. 3, the following method is applied to a compressed image frame:

1) in accordance with step 100, look in buffer 120 at the next $240 - N_{mi}$ data segments (i.e., the total number of data segments to be sent from the next location of arrow 180 in the broadcast frame that is currently being sent onward);

2) in accordance with step 200, subject to the pair rule select the specific $240 - N_{mi}$ data segments sent at rate $C_1$.

As mentioned above, the received picture quality is a function of the insensitivity of the symbols to noise (related to the channel rate) and to the global importance of the signals arriving at buffer 120. The latter is related to a "target distortion" parameter, $D_T$. For the purposes of this example, the target distortion, $D_T$, is assumed to be constant over a large period of time (i.e., slowly varying with image frames). Assuming, for the moment, that all data is transmitted at the higher channel rate, $C_2$, i.e., without soft coding, the target distortion is set by buffer control 170 by solving the following buffer control equation:

$$b \log D_T = R_2 + \widetilde{B}_{t+1} - B_t - a, \tag{1}$$

where a and b are performance model parameters (discussed below) associated with video encoder 110; $R_2$ is the number data segments that can be sent during $t_f$ if all segments were sent at rate, $C_2$; $\widetilde{B}_{t+1}$ is the desired buffer fullness (in data segments) after encoding the next image frame, i.e., at $t+1$; and $B_t$ is the current buffer fullness (mentioned above).

The desired buffer fullness is computed by the following equation:

$$\widetilde{B}_{t+1} = B_{ref} + (B_t - B_{ref})k, \tag{2}$$

where $B_{ref}$ is the desired level of buffer fullness over a large period of time, and k is a buffer control parameter that is constant, where $0 \leq k \leq 1$.

The calculations of the values of a and b are based on characteristics of previous compressed image frames that have been transmitted, i.e., on the history of the prior image frames, e.g., the coefficients provided by video encoder 110. For the purposes of this illustration, the values of a and b are computed from the following two equations which comprise data from the previous two compressed image frames at $t-1$, and $t-2$:

$$b = \min(b_{max}, (R_{t-1} - R_{t-2})/(\log(D_{t-1}) - \log(D_{t-2}))), \quad (3)$$

$$a = R_{t-1} - b \log(D_{t-1}). \quad (4)$$

From equations (3) and (4) it can be seen that the value of b, as determined by equation (3), is used in equation (4) to calculate the value of a. In experimental realizations, $k=0.7$, and $b_{max} = -0.2$.

Since the values of a and b are dependent on the history of the compressed image sequence, a problem can result during a "scene change," i.e., where the characteristics of a compressed image frame abruptly change from one compressed image frame to the next compressed image frame. A scene change can be detected by statistically measuring the variance of the displaced frame difference (DFD), $\sigma_{DFD}^2$, and comparing it to an historical variance of the DFD for the sequence of compressed image frames, $\sigma_{source}^2$. An example of DFD is shown in the Johnson et al. application mentioned above. The detection of a scene occurs when:

$$\sigma_{DFD}^2 > \beta \sigma_{source}^2. \quad (5)$$

An experimental value of $\beta = 0.5$ has been used. Once a scene change has been detected, experimental values of $a = 1.0$, and $b = -0.5$ are used. Experimental results have shown that for the fourth compressed image frame after a scene change the output from video encoder 110 is fairly stable and buffer control equations (3) and (4) can again be used to determine the parameter values.

Since values for the various parameters can now be determined, as a result of equation (2), buffer control equation (1) can be rewritten as $$b \log D_T = R_2 + (B_t - B_{ref})(1-k) - a. \quad (7)$$

Figure 4:
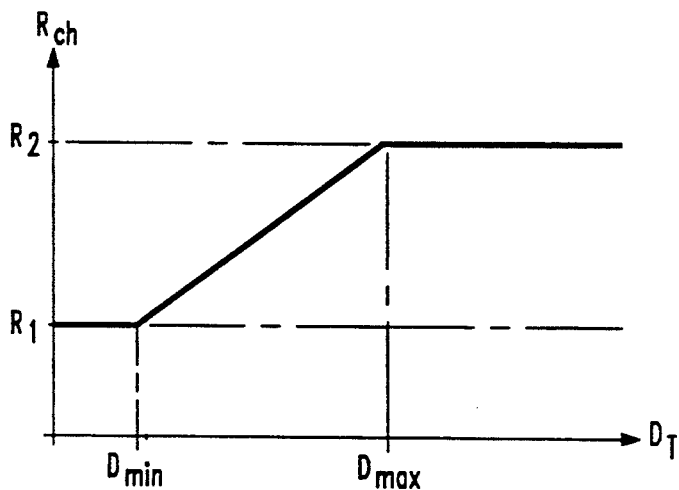
FIG. 4 is an illustrative graph of channel rate versus target distortion.

If $R_2$ corresponds to the situation where the data is not too critical and, therefore, can all be sent at rate $C_2$—corresponding to a $D_{max}$ target distortion—, and if $R_1$ corresponds to the situation where all of the data is critical and should be sent at rate $R_1$—corresponding to a $D_{min}$ target distortion—, then, by linear interpolation as depicted, for example, in FIG. 4, a rate $R_{ch}$ can be evaluated for any target distortion between $D_{max}$ and $D_{min}$. Hence, a proper formulation of equation (7) is:

$$b \log D_T = R_{ch}(D_T) + (B_t - B_{ref})(1-k) - a. \quad (8)$$

Figure 5:
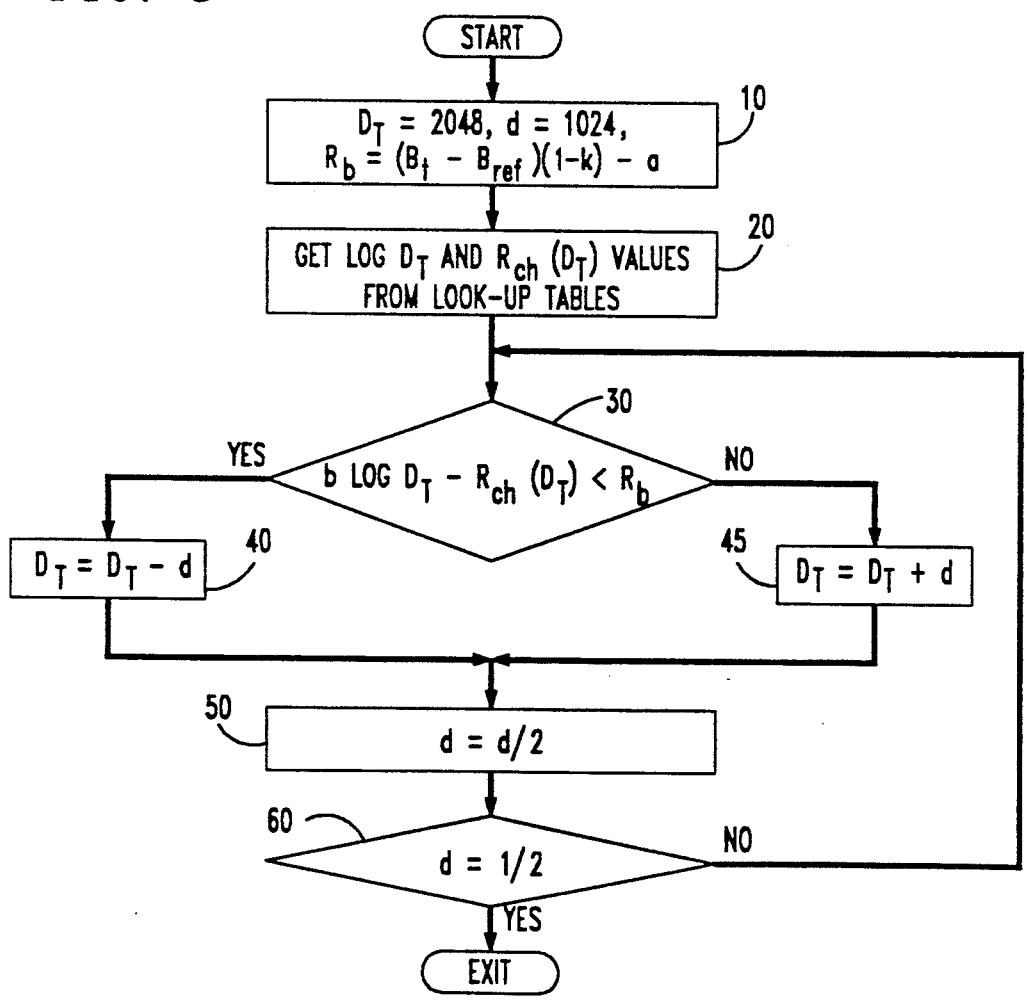
FIG. 5 is an illustrative flow diagram of a method for determining the target distortion of a compressed image frame.

An iterative method, shown in FIG. 5, can be used to find the target distortion. Every iteration requires a comparison and an evaluation of Equation (8), where $R_{ch}(D_T)$ and $\log D_T$ are table look-up values. The number of iterations is typically not more than 12. Access to the plot of FIG. 4 is effected through a look-up table. The look-up table for $R_{ch}(D_T)$ is constructed so that starting at $R_2$ the channel rate can only decrease with discrete steps of size number of bits in a data segment. The look-up tables illustratively comprise 4096 entries because the target distortion is 12 bits. From FIG. 5, for each compressed image frame, the iterative method begins at step 10, which initializes the variables: $D_T$, d, and calculates the value of $R_b = (B_t - B_{ref})(1-k) - a$. In step 20, the look-up values are determined for $\log D_T$ and $R_{ch}(D_T)$. A conditional value is then calculated in step 30, which is used to adjust the target distortion, $D_T$, by $\pm d$ in steps 40 and 45, respectively. In step 50, the step size, d, is adjusted. Finally, steps 20, 30, 40 or 45, and 50 are repeated until $d = \frac{1}{2}$ in step 60.

The buffer control algorithm described above returns the target distortion, as in the case of no soft coding, and also return the number of data segments that are to be encoded with 1 bit per symbol, $N_{mi}$. This number is computed by $$N_{mi} = (R_2 - R_{ch}(D_T)). \quad (9)$$

Having determined the number, $N_{mi}$, the task is to choose the actual data segments for transmission at the various rates. These $N_{mi}$ data segments can be chosen in a number of ways, e.g., the first $N_{mi}$ data segments can be chosen, the $N_{mi}$ data segments can be chosen randomly, or the $N_{mi}$ data segments can be chosen based upon their importance in terms of effecting the picture quality. The first two methods are straightforward to implement and will not be discussed further herein. The last method, assigning the $N_{mi}$ data segments in terms of the segment importance is implemented by establishing a criteria to determine the level of importance of a segment, and allocation of the $N_{mi}$ data segments given a level of importance of any segment.

Determining the importance of a segment is one of design choice and is dependent on the method of video encoding. For example, in motion compensated predictive coding the number of motion vector bits can be used as an indicator of the importance of a data segment.

Figure 6:
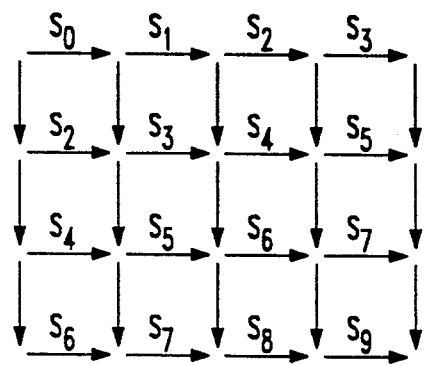
FIG. 6 is an illustrative graph for choosing the $N_{mi}$ data segments.

In light of the rules mentioned above for allocating data segments, choosing the $N_{mi}$ data segments is equivalent to finding the optimal path through a graph like the one shown in FIG. 6, but with dimensions ($N_{mi}$, $120 - N_{mi}$) instead of (4,3). The total number of data segments is $240 - N_{mi}$ (instead of 10 as in FIG. 6).

From FIG. 6, each $S_i$, where $0 \leq i \leq 9$, is the importance score for each data segment (determined in accordance with the chosen method of determining importance discussed above). The optimal path is defined as:

$$\max \sum_i S_i \quad (10)$$

where i is in a path from the upper left to the lower right corner of the graph. The solution is obtained by finding the maximum score $S(m,n)$ for every node $N(m,n)$ when coming from the left node $N(m-1,n)$ or the above node $N(m,n-1)$:

$$S(m,n) = \max\{S(m,n-1), S(m-1,n) + S_i\}, \quad (11)$$

with, $$S_i = S_{2n+m-1} \quad (12)$$

being the score for going from node N(m−1,n) to node N(m,n). Note, that there is no score when going down the graph. The scores for every node are obtained by traveling the nodes in a scan-like fashion with initial values of:

$$S(m,0) = \sum_{i=0}^{i=m-1} S_i, \text{ where } m = 0, \ldots, N, \text{ and} \quad (13)$$

$$S(0,n) = 0, \text{ where } n = 0, \ldots, 120 - N.$$

After every "iteration" the path is kept for every node by storing a zero for that node when coming from its left neighbor or storing a one when coming from its neighbor above. The optimal path can be found by backtracking the zeroes and ones from the end node to the start node.

The foregoing merely illustrates the principles of the invention and it will thus be appreciated that those skilled in the art will be able to devise numerous alternative arrangements which, although not explicityly described herein, embody the principles of the invention and are within its spirit and scope.

For example, other buffer control equations can also be used. As illustrated herein, the buffer control equation was represented by a linear control function, i.e., a linear equation, however, the buffer control equation can also be an exponential control function, or can be more directly coupled to the coefficients for each compressed image frame provided by the video encoder. Also, the buffer control parameter values, which as illustrated herein are dependent on the characteristics of the previous two image frames that have been transmitted, can be any function of the transmitted image frame history, e.g., the updates can be based only on the characteristics of the last image frame. Finally, the global information field and the data segments may also be source encoded (e.g., Reed/Solomon encoding). Further, all of the specific numbers used herein are for illustrative purposes only (e.g., a mask size of 240 bits can also be used).

In addition, although the invention is illustrated herein as being implemented with discrete functional building blocks, e.g., buffers, formatters, etc., the functions of any one or more of those building blocks can be carried out using one or more appropriate programmed processors.

We claim:

1. A method for transmitting signals that represent symbols, comprising the steps of
    adaptively selecting the size of a portion of a data block, based on characteristics of the data in the block,
    transmitting the selected portion at a first channel rate, and
    transmitting the remainder of the data block at a different channel rate.

2. The method of claim 1 wherein said first channel rate corresponds to a first number of data bits of said data block per transmitted symbol, and said different channel rate corresponds to a second number of data bits of said data block per transmitted symbol.

3. The method of claim 1 wherein the step of adaptively selecting includes the steps of
    calculating a target distortion measure for data potentially included in said data block,
    determining the size of said data block in accordance with said target distortion measure, and
    assigning data considered in said step of calculating to said data block in accordance with said determined size.

4. The method of claim 3 wherein said step of adaptively selecting the size of a portion of a data block allocates for said selected portion a fixed number of bits from the data assigned to the data block.

5. The method of claim 1 wherein said data block comprises data segments of fixed sizes and said step of adaptively selecting comprises the step of choosing segments of said data block for transmission at said first rate, such that the sum of the sizes of the chosen segment equals the size of said portion.

6. A method for transmitting a signal, the signal representing a sequence of symbols, comprising the steps of
    determining a distortion rate measure for data stored in a buffer,
    based on said distortion measure, determining an amount of said data that is transmitted in a given number of symbols,
    selecting from said amount of said data some portions such that said some portions and a remaining portion equal said determined amount of said data,
    transmitting said some portions at the rate of bits per symbol and
    transmitting said remaining portion at another rate of bits per symbol.

7. A method for transmitting a signal, the signal representing a sequence of symbols, the sequence of symbols representing a frame having N data segments, where N>0, comprising the steps of
    determining a distortion rate measure for data stored in a buffer,
    based on said distortion measure, determining a number, $N_{mi}$, of first type data segments wherein a portion of the sequence of symbols carry information at a first rate of bits per symbol in a time segment and where such time segment thereby carries a first number of bits, and consequently determining the number $N-N_{mi}$ of second type data segments wherein the remaining portion of the sequence of symbols carry information at a second rate of bits per symbol in the time segment and thereby such time segment carries a second number of bits,
    selecting data from the buffer in accordance with a preselected criterion so that the number of bits of data selected adds up to $N_{mi}$ times the first number of bits per time segment that forming a first portion, plus $N-N_{mi}$ times the second number of bits per time segment, that forming a second portion,
    transmitting said first portion at the first rate of bits per symbol, and
    transmitting said second portion at the second rate of bits per symbol.

8. The method of claim 7 where the selecting step includes the steps of
    determining the importance of the data in the buffer, and
    responsive to the importance of the data in the buffer, selecting the more important data so that the number of bits selected adds up to $N_{mi}$ times the first number of bits per time segment.

9. The method of claim 7 where the selecting step includes the steps of determining the importance of the data in the buffer, and responsive to the importance of the data in the buffer, selecting the more important data for said first portion.

10. A method comprising the steps of developing a distortion rate measure for a frame of data, said frame of data comprising a plurality of elements, responsive to said measure, allocating a block of said frame of data for transmission in a time frame, selecting elements of said block for transmission using a first encoding scheme, with the remainder of said block using a second encoding scheme, encoding the selected elements of the block in the first encoding scheme, and encoding the remaining elements of the block in the second encoding scheme, where the second encoding scheme is more susceptible to noise relative to the first encoding scheme.

11. Apparatus for transmitting signals that represent symbols comprising means for adaptively selecting the size of a portion of a data block, based on characteristics of the data in the block, means for transmitting the selected portion at a first channel rate, and means for transmitting the remainder of the data block at a different channel rate.

12. The apparatus of claim 11 wherin said first channel rate corresponds to a first number of data bits of said data block per transmitted symbol, and said different channel rate corresponds to a second number of data bits of said data block per transmitted symbol.

13. The apparatus of claim 11 wherein the means for adaptively selecting a size of a portion of a data block calculates a target distortion measure for data potentially included in said data block, and determines the size of said data block in accordance with said target distortion measure, and assigns data considered in the calculation to said data block in accordance with said determined sized.

14. The apparatus of claim 13 wherein the means for adaptively selecting a size of a portion of a data block allocates for said selected portion a fixed number of bits from the data assigned to the data block.

15. Apparatus comprising means for generating a plurality of video compressed images, means responsive to the plurality of video compressed images for providing a sequence of formatted broadcast frames, each formatted broadcast frame comprising at least a) location information and b) one of the plurality of video compressed images, where said location information further comprises information about the allocation of portions of said one of the plurality of video compressed images to a plurality of channel rates, and means for transmitting each one of said portions of the video compressed image at its respective allocated channel rate for each one of the sequence of formatted broadcast frames;

where the means responsive to the plurality of video compressed images adaptively determines said information about the allocation of each one of said portions of the video compressed image to one of the plurality of channel rates for each formatted broadcast frame.

* * * * *